US007389305B1

(12) United States Patent
Kindig et al.

(10) Patent No.: US 7,389,305 B1
(45) Date of Patent: Jun. 17, 2008

(54) SYSTEM AND METHOD FOR MANAGING A DATABASE

(75) Inventors: Brad Kindig, San Diego, CA (US); Kevin Sitze, San Diego, CA (US)

(73) Assignee: Fair Isaac Corporation, San Diego, CA (US)

( * ) Notice: Subject to any disclaimer, the term of this patent is extended or adjusted under 35 U.S.C. 154(b) by 0 days.

(21) Appl. No.: 09/323,512

(22) Filed: Jun. 1, 1999

(51) Int. Cl.
G06F 17/00 (2006.01)
G06F 12/00 (2006.01)

(52) U.S. Cl. ............... 707/103 R; 707/200; 707/205; 707/206

(58) Field of Classification Search .......... 707/1, 707/3, 8, 103, 200, 203–206, 103 R; 711/113, 711/117, 129, 130, 160, 116; 709/224, 227
See application file for complete search history.

(56) References Cited

U.S. PATENT DOCUMENTS

| | | | | |
|---|---|---|---|---|
| 4,186,438 | A | 1/1980 | Benson et al. | 711/113 |
| 4,422,145 | A | 12/1983 | Sacco et al. | 711/160 |
| 4,574,346 | A | 3/1986 | Hartung | 711/117 |
| 4,996,663 | A | 2/1991 | Nemes | 707/200 |
| 5,121,495 | A | 6/1992 | Nemes | 707/3 |
| 5,235,701 | A | 8/1993 | Ohler et al. | 707/1 |
| 5,317,731 | A | 5/1994 | Dias et al. | 707/8 |
| 5,390,359 | A * | 2/1995 | Damerau | 707/3 |
| 5,493,668 | A | 2/1996 | Elko et al. | 711/130 |
| 5,561,785 | A * | 10/1996 | Blandy et al. | 711/170 |
| 5,594,881 | A * | 1/1997 | Fecteau et al. | 711/209 |
| 5,604,902 | A * | 2/1997 | Burkes et al. | 707/206 |
| 5,706,506 | A | 1/1998 | Jensen et al. | 707/103 |
| 5,717,893 | A | 2/1998 | Mattson | 711/129 |
| 5,721,915 | A * | 2/1998 | Sockut et al. | 707/200 |
| 5,765,149 | A | 6/1998 | Burrows | 707/5 |
| 5,809,494 | A * | 9/1998 | Nguyen | 701/15 |
| 5,826,259 | A * | 10/1998 | Doktor | 707/4 |

(Continued)

OTHER PUBLICATIONS

Fredman, M.L.; "The complexity of information structures"; Feb. 9-12, 1981; p. 152.*

(Continued)

*Primary Examiner*—Ella Colbert
(74) *Attorney, Agent, or Firm*—Michael A. Glenn; Glenn Patent Group

(57) ABSTRACT

A system and a method for managing a database. The system includes a database manager for storing and retrieving data records from a database. In one embodiment, the database includes a database data structure that is divided into a plurality of sections. Each of the sections holds is configured to hold zero or more data records. During a store operation of a data record, a key that is associated with the data record is used to identify one of the sections. The system determines whether the identified section has sufficient space to contain the identified data record. If the section has insufficient space, the system deletes data records according to a ranking function. In one embodiment of the invention, the ranking function is a least recently used algorithm. The system of the present invention does not have any inter-dependency between the data records that are stored within the database. Furthermore, in one embodiment of the invention, the system creates the database using sections that are the same size that is used by a caching system to store and retrieve pages from mass storage.

21 Claims, 14 Drawing Sheets

U.S. PATENT DOCUMENTS 5,845,298 A * 12/1998 O'Connor et al. ............ 707/206
5,881,379 A *  3/1999 Beier et al. .................. 707/101
5,895,461 A     4/1999 De La Huerga et al. ......... 707/1
5,897,637 A *  4/1999 Guha .......................... 707/101
5,991,776 A * 11/1999 Bennett et al. ............... 707/205
6,003,022 A * 12/1999 Eberhard et al. ................ 707/2
6,330,557 B1 * 12/2001 Chauhan ........................ 707/3

OTHER PUBLICATIONS

Williams, M.E; Barth, S.W., and Preece, S.E.; "Summary statistics for five years of MARC data base"; vol. 12, No. 4; p. 1.*

David H.C. Du and Sheau-Ru Tong; "Multilevel Extendible Hashing: A File Structure for Very Large Database"; IEE; Sep. 1991; vol. 3, Issue 3; pp. 357-369.*

* cited by examiner

SYSTEM AND METHOD FOR MANAGING A DATABASE

BACKGROUND OF THE INVENTION

1. Field of the Invention

The field of the invention relates to database systems. More particularly, the present invention relates to a system and method for managing a database.

2. Description of the Related Technology

As the use of the Internet has become more and more popular, various database systems have been developed to track information that is associated with each of the users at an Internet site. These database systems can store demographic information, a list of user preferences, or other information about each of the users of a particular site.

One problem that has been encountered by these database systems is that it is time consuming to access and search the data once it has been accumulated. Often, database systems consist of millions of items of data which are permanently stored on a mass storage medium. However, not all of the data is "fresh", or, in other words, relate to current activity of the user. Therefore, various trash management systems have been developed to eliminate old or non-useful data from the database system. One system that has attempted to solve trash management is described in U.S. Pat. No. 5,121,495 to Nemes. Nemes uses a hashing scheme whereby each of the data records in a database has an expiration date. Once a data record has expired, the Nemes system removes the record from the database. However, the Nemes system fails once database is completely full with unexpired data.

Another problem that has been identified is that many databases are designed such that information on one page references information on another one of the pages. This often occurs in tree, chain, or indirect systems. In these systems, if one page is successfully written and an attempt to write a dependent page fails, a corruption is introduced into the database.

Therefore, there is a need for a system that is efficient in handling large numbers of transactions. Furthermore, there is a need for a system that does not introduce interdependencies between each of the pages of the database. Thus, if one of the pages is contaminated, the other pages remain unaffected by the contamination.

SUMMARY OF THE INVENTION

One embodiment of the invention includes a method of managing a database that includes a plurality of sections, each of the sections capable of holding data records, the method comprising receiving a new data record and a key that is associated with the new data record, identifying one of the sections based upon the associated key of the new data record, deleting one or more data records from the identified section if the identified section does not have sufficient space to contain the new data record, and storing the new data record in the identified section.

Another embodiment of the invention includes a program storage device storing instruction that when executed perform the steps comprising receiving one or more new data records, each of the new data records having an associated key, identifying a section from a plurality of sections, the identifying based upon the associated key of the new data record, deleting one or more data records from the identified section if the identified section does not have sufficient space to contain the new data record, and storing the new data record in the identified section.

Yet another embodiment of the invention includes a database system for managing data records, the system including: a plurality of sections, each of the sections is about the same size that is used by an operating system to transfer data between a primary storage and a secondary storage; and a control program which receives a request for the storage of a data record, the control program selecting one of the sections based upon a key and storing the data record in the selected section.

Yet another embodiment of the invention includes a database system for managing information items, the system including a plurality of sections, and a control program which receives a request for the storage of a data record, the control program selecting one of the sections and storing the data record in the selected section, the control program determining whether the selected section contains sufficient unused space to hold the data record, and if the section does not have sufficient space, the control program removing selected data records according to a ranking function Yet another embodiment of the invention includes a system for managing a database that includes a plurality of sections, each of the sections capable of holding data records, the method comprising means for receiving one or more new data records, each of the new data records having an associated key, means for identifying one of the sections based upon the associated key of the new data record, means for deleting one or more data records from the identified section if the identified section does not have sufficient space to contain the new data record, and means storing the new data record in the identified section.

Yet another embodiment of the invention includes a database system for managing information records, the system including a primary storage, a secondary storage having a plurality of pages, a plurality of sections, each of the sections adapted to contain one or more data records, each of the sections residing in the secondary storage on one of the plurality of pages, and a control program which receives a request for the retrieval of a data record, the control program retrieving the data record from the secondary storage and storing the data record in the primary storage, the retrieval operation reading at most one page from the secondary storage.

Yet another embodiment of the invention includes a database system for managing information items, the system including a primary storage, a secondary storage having a plurality of pages, a plurality of sections, each of the sections independent of each of the other sections such that an error in one of the sections does not affect any of the other sections, and a control program which receives a request for =the retrieval of a data record, the control program retrieving the data record from the secondary storage and storing the data record in the primary storage.

Yet another embodiment of the invention includes a database system for managing information items, the system including a client application, a primary storage comprising a plurality of pages, a secondary storage comprising a plurality of pages, a caching subsystem for copying pages from the primary secondary storage to the pages in the primary storage and vice-versa, a database data structure having a plurality of sections, each of the sections residing on one of the pages in the primary storage and/or the secondary storage, a database manager which receives requests from the client application to store and a data record in the database data structure, the database manager selecting one of the sections and storing the data record in the selected section, the database manager determining whether the selected section contains sufficient unused space to hold the data record, and if the section does not have sufficient space, the database manager removing selected data records according to a ranking function.

DETAILED DESCRIPTION OF THE PREFERRED EMBODIMENTS

The following detailed description is directed to certain specific embodiments of the invention. However, the invention can be embodied in a multitude of different ways as defined and covered by the claims.

Figure 1:
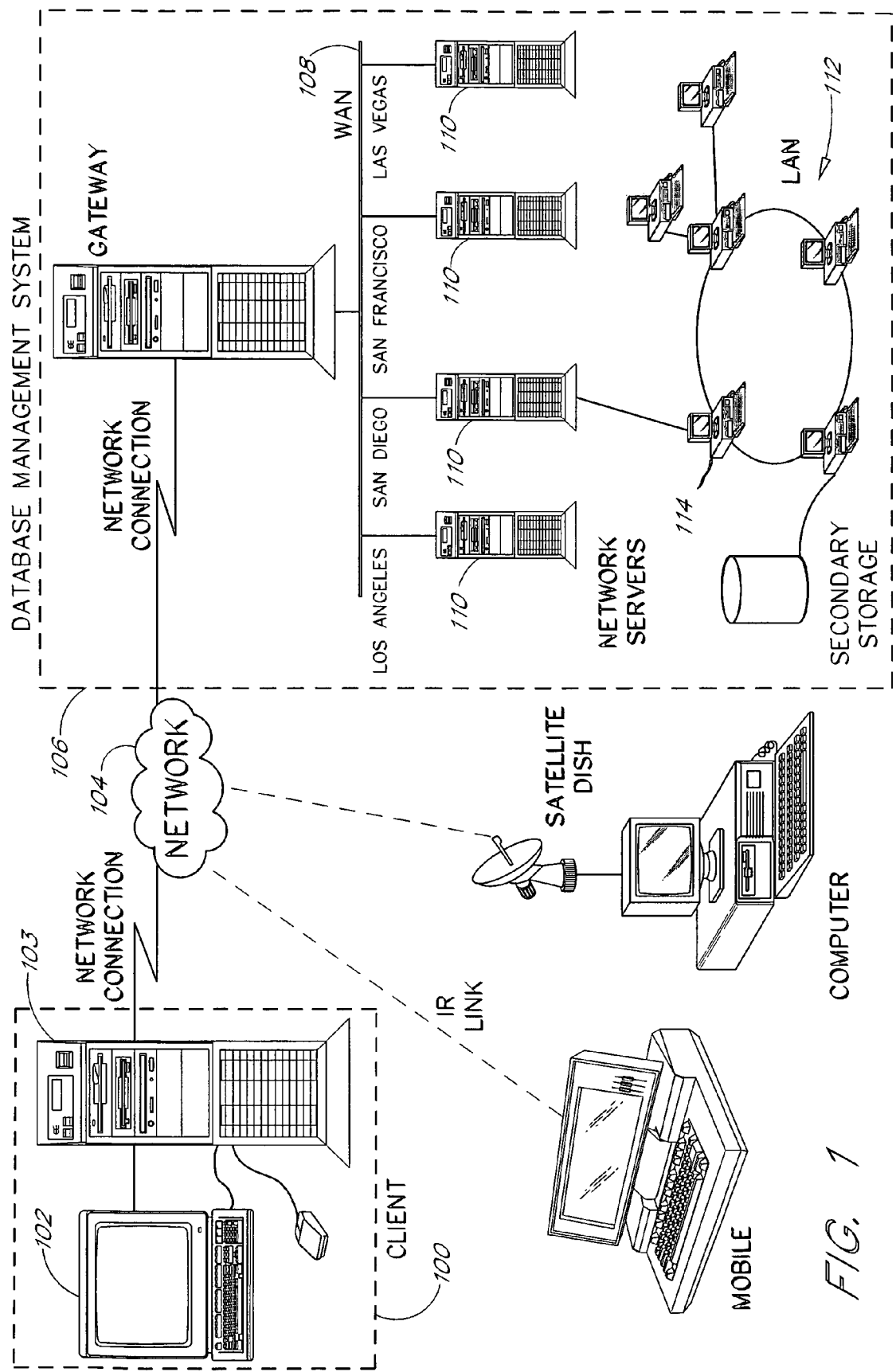
FIG. 1 is a block diagram illustrating one computing environment for a database management system of the present invention.

FIG. 1 is a block diagram illustrating a computer environment associated with the present invention. A client computer 100 has a monitor 102 and a processing unit 103. The processing unit 103 includes a data storage.

The client computer 100 stores information that may be exported to other computing devices through a network 104. The network may include any type of electronically connected group of computers, including for instance the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration. As used herein, an Internet includes network variations such as public internet, a private internet, a secure internet, a private network, a public network, a value-added network, an intranet, and the like.

Based upon a request from the client computer 100, a database management system 106 can store and retrieve information. In one embodiment of the invention, the database management system 106 includes a gateway which is connected to a WAN 108. The WAN 108 has a plurality of network servers 110. One of the network servers 110 is connected to a LAN 112 comprising a plurality of computers 114. The database management system 106 stores and retrieves information that may be located on one of the network servers 110 or another computer in the network 104. In one embodiment of the invention, database management system programs executes in part on a plurality of the network servers. In another embodiment of the invention, the database management system programs executes on a plurality of the computers 114 on the LAN 112. In yet another embodiment of the invention, the database management system programs resides on the client computer 100. It is important to understand that the system programs of the present invention may be hosted on any computing device so long as a communication pathway exists between the database management system 106 and an application program that is need of the services which are provided by the database management system 106.

Figure 2:
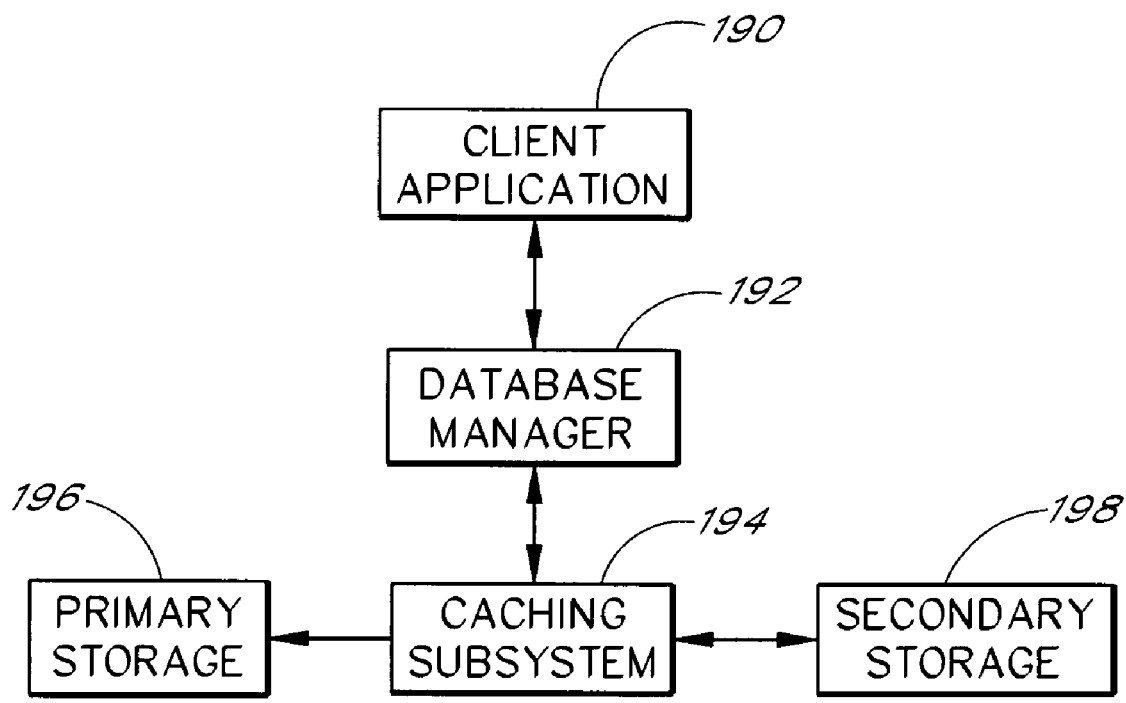
FIG. 2 is a block diagram illustrating the components of the database management system shown in FIG. 1.

FIG. 2 is a high-level block diagram of the database management system 106 of the present invention. In one embodiment of the invention, the database management system 106 is in communication with a client application 190. The client application 190 can be any type of software program that is in need of a database. For example, the client application 190 can be user profile demographic system ("user profile system"), an e-commerce sales system, an inventory tracking system, or a word processor. For convenience of description, the remainder of the description will assume that the client application 190 is a user profile system which tracks the usage of a website by one or more users.

In one embodiment of the invention, the client application 190 resides on the client computer 100. In another embodiment of the invention, the client application 190 is integrated with the database management system 106 into a single computer platform.

The database management system 106 also includes a database manager 192. The database manager 192 exports an database application programming interface ("API") to the client application 190. By using the database API, the client application 190 can store and retrieve information from the database management system 106. The database manager 192 can interact with more than one client application 190.

The database manager 192 is comprised of various modules. As can be appreciated by one of ordinary skill in the art, each of the modules comprise various sub-routines, procedures, definitional statements, and macros. Each of the modules are typically separately compiled and linked into a single executable program. Therefore, the following description of each of the modules is used for convenience to describe the functionality of the database manager 192. Thus, the processes that are undergone by each of the modules may be arbitrarily redistributed to one of the other modules, combined together in a single module, or made available in a shareable dynamic link library.

In one embodiment of the invention, the database manager 192 uses a hashing scheme to store and retrieve data. Hashing is a well known technique for storing and retrieving information from a computer storage. In a system using hashing, a key is operated upon by a hashing function to produce a storage address in a hash table. The hashing function translates the key into addresses uniformly distributed throughout the hash table. Once an address is generated, the system accesses the desired storage location in the hash table.

Table 1 sets forth below each of the functions that are exported by the database manager in the database API to the client application 190.

TABLE 1

| FUNCTION | FUNCTION DESCRIPTION |
|---|---|
| Create | Creates and initializes a new database. |
| Open | Opens a previously created database. |
| Put | Put a [key, element] pair into the currently opened database. |
| Get | Obtains a data structure, given a key. |
| Delete | Given a key, removes a data record from the database. |
| Sequence | Iterates either forward or backwards through each of the data records in the database. |
| Close | Closes the database that is currently open. |

The database management system 106 also includes a caching subsystem 194. The caching subsystem 194 uses one of various well-known caching strategies to keep frequently accessed pages easily accessible in a primary storage 196. The caching subsystem can be any off-the shelf caching program, such as shareware versions of caching program, known as Berkley DB, available from the University of California at Berkley. In one embodiment of the invention, the primary storage 196 is a random access memory ("RAM"). The database management system 106 also includes a secondary storage 198. The secondary storage 198 can include any type of storage device such as a mass storage adapter. In one embodiment of the invention, the caching subsystem 194 and the secondary storage 198 are merged into a single storage system.

Figure 3:
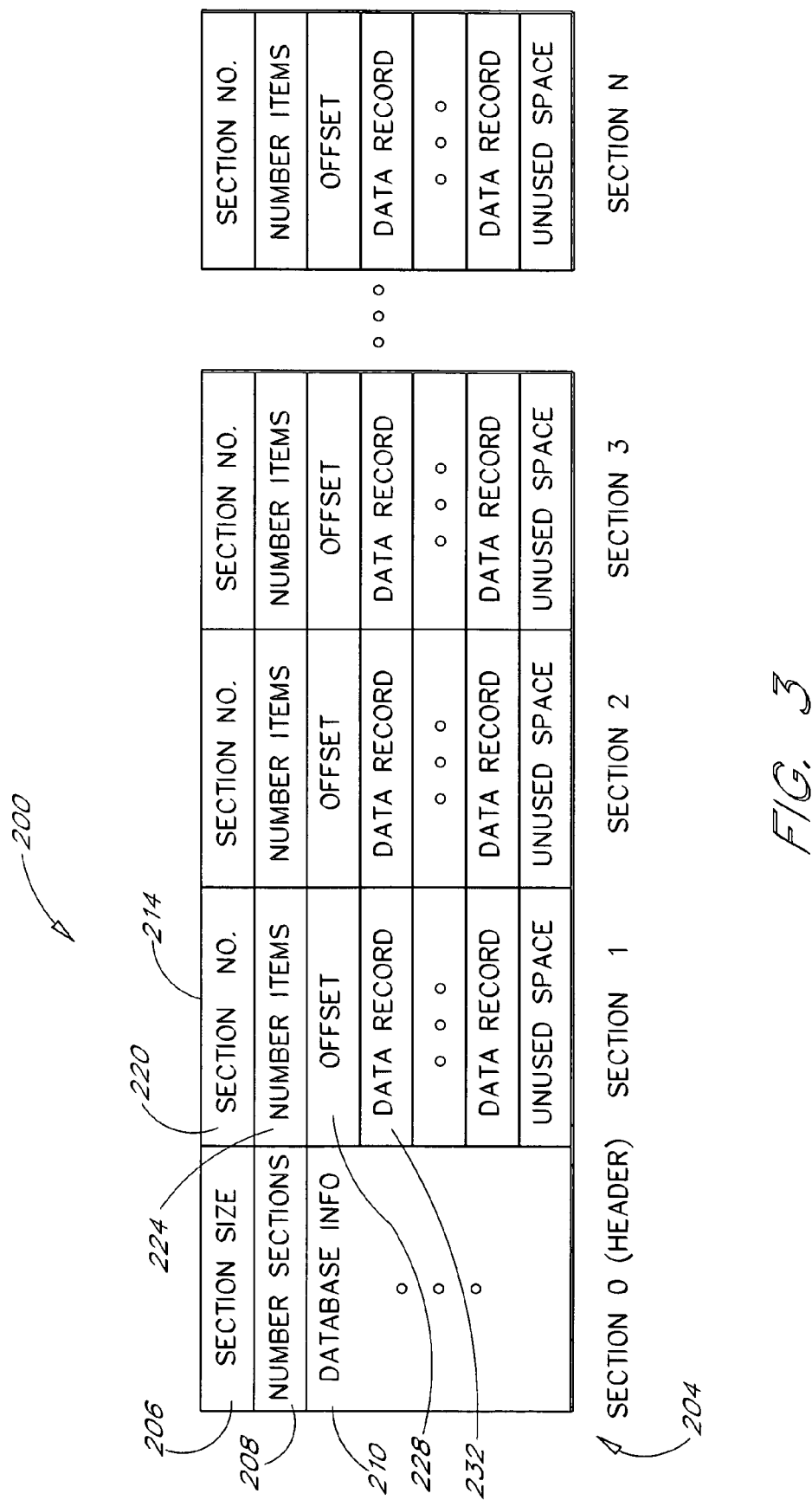
FIG. 3 is block diagram illustrating the format of a database data structure which is managed by the database management system of FIG. 1.

FIG. 3 illustrates an exemplary database data structure according to one embodiment of the present invention. The database data structure 200 is partitioned into a number of sections. Preferably, the size of each of the sections is an integer multiple of same size that is used to transfer data between the primary storage 196 and the secondary storage 198 by the operating system (not shown). For example, for an embodiment of the present invention that is designed for use with Sun Solaris 2.5.1 of UNIX available from Sun Microsystems, Inc., the page size can be defined to be either or 8,192 16,384, or 32,768 bytes.

The database data structure 200 contains a header section 204 that describes the format of the database data structure 200. In one embodiment of the invention, the header section 204 is the first section in the database data structure 200. Alternatively, the information that is maintained by the header section can be maintained outside of the database data structure 200. The header section 204 includes a section size field 206, a total section number field 208, and a database information field 210. The section size field 206 defines the length of each of the sections in the database data structure 200. In a preferred embodiment of the invention, each of the sections are of a uniform length. However, sections of varying length may also be employed.

The total section number field 208 defines the number of sections that are contained within the database data structure 200. In a preferred embodiment of the invention, the total number of sections within database management system 106 is statically defined upon the creation of the database manage system. However, in another embodiment of the invention, the number of sections within the database data structure 200 can be dynamically adjusted. In one of the fields in the header section 204, the database information field 210, holds administrative information about the database data structure 200. For example, the database information field 210 can hold statistics about the number of items that have been dropped, the mean age of the items dropped, the mean number of data records per section, the standard deviations for the means, the byte ordering for the database data structure 200, a "magic" number identifying the database data structure 200 as being a database data structure, a hash function identifier and/or a version number of the database.

The database data structure 200 also contains a number of data sections 214. Each of the data sections 214 includes a section number field 220, a total data records (number items) field 224, and an offset field 228. The section number field 220 contains the section number that uniquely identifies the respective section. The total data records field 224 includes the total number of data records that are contained within the respective section. Upon the initialization of the database data structure 200, the number of data records is equal to zero. However, as data records are stored and deleted by the client application 190, the total number of data records within a section can vary.

The offset field 228 describes the position of the next available unused space within the section. In one embodiment of the invention, the next available position is a relative measurement in bytes from the beginning of the section. However, it is to be appreciated that other measurement units can be used, such as bits.

Further, each of the sections 214 contain zero or more data records 232, each of the data records 232 being of, in one embodiment, variable length. Each of the data records 232 contain information which may be used by the client application 190. The structure of each of the data records 232 is set forth in further detail below with reference to FIG. 4.

Figure 4:
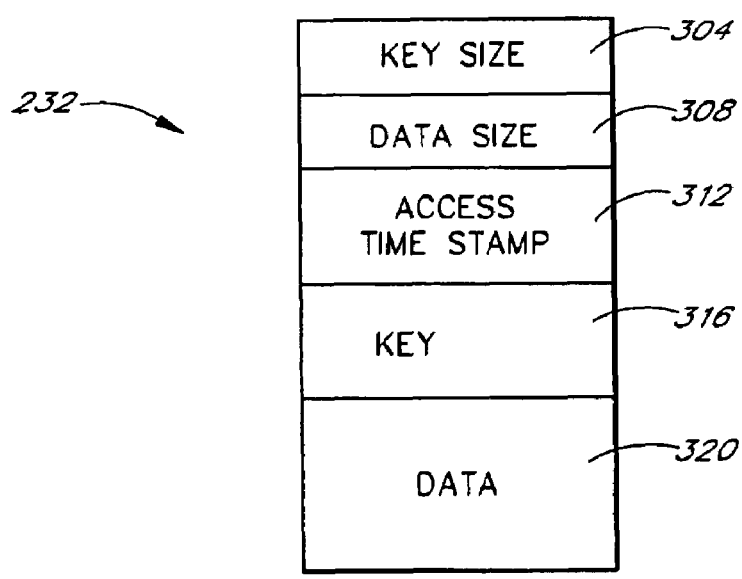
FIG. 4 is a block diagram illustrating the structure of one of the data records of the database data structure of FIG. 3.

FIG. 4 is a block diagram illustrating the various parts of the data records 232. Each of the data records 232 includes a key size field 304, a data size field 308, an access time stamp field 312, a key field 316, and a data field 320. The key size field 304 identifies the length of the key field 316. The data size field 308 identifies the length of the data field 320. In one embodiment of the invention, the key size field 304 and the data size field 308 contain a number of bytes. However, it is to be appreciated that other units for size can be used. For example, in another embodiment of the invention the data size field 308 contain a number of bits. The access time stamp field 312 indicates the last time that the data structure 232 was accessed or modified. The key field 316 identifies a unique key that is associated with the respective data structure 232. The data field 320 contains data that has been requested to be stored by the client application 190 (FIG. 2). For example, for embodiments of the present invention wherein the client application 190 is a user profile system, each of the data fields 320 includes information that is associated with a user. In this embodiment, the data 320 can include: a name of a user, a user-id for the user, the number of times the user visited a website, the actions that were performed by the user during a website visit, the preferences expressed by the user, the age of a user, the gender of the user, or other demographic information.

Method of Operation

Figure 5:
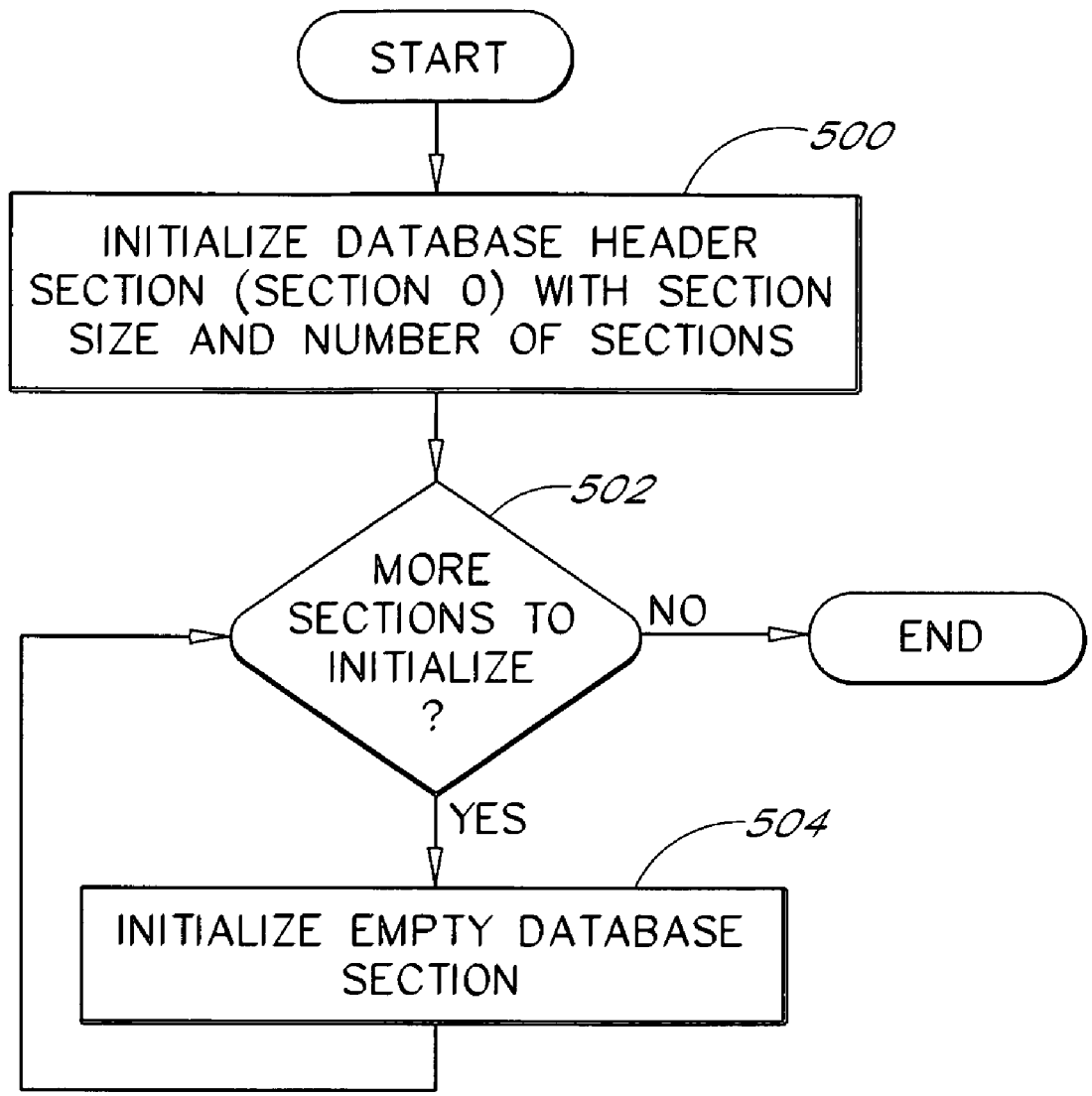
FIG. 5 is a flowchart illustrating a database creation process for creating the database data structure shown in FIG. 3.

FIG. 5 is a flowchart illustrating one embodiment of a process for creating the database data structure 200 (FIG. 3). The database management system 106 (FIG. 2) can maintain multiple distinct database data structures 200 during its operation. Starting at a state 500, the database manager 192

(FIG. 2) has received a create request from a client application 190 (FIG. 2). At the state 500, the client application 190 invokes the create function which is exported by the database manager 192 to the client application 190. As part of the create function, the client application 190 passes a number of parameters, including: a filename, an integer indicating the number of pages that are to be allocated within the database, and an integer indicating the size of each of the sections. At the state 500, the database management system 106 creates and stores the database data structure 200 on the secondary storage 198 using the specified file name. In one embodiment of the invention, the size of the database data structure 200 is determined by Equation 1.

$$\text{Size} = \text{Section Size} \times (\text{Number of Sections} + 1). \quad (1)$$

Where Section Size=section size identified in one of the parameters of the open function, and Number of Sections=number of sections identified in one of the parameters of the open function.

It is noted that in determining the size of the database data structure 200, the variable "Number of Sections" is incremented by one so that space may be made for the header section 204.

Still referring to the state 500, the database management system 106 (FIG. 2) initializes the header. The database management system 106 sets the section size field 206 to be equal to the size which was identified by the section size parameter of the create function. Furthermore, the database management system 106 sets the total section number field 208 equal to the section number that was passed by the number of sections parameter of the create operation.

Moving to a decision state 502, the database management system 106 (FIG. 2) determines whether there are additional data sections to initialize. Upon first reaching the decision state 502, the database management system 106 has already initialized the header section 204; however, each of the data sections 214 is still in need of initialization. At the decision state 502, if the database management system 106 determines that there are additional sections to initialize, the database management system 106 proceeds to a state 504.

At the state 504, the database management system 106 (FIG. 2) initializes an un-initialized data section. At the state 504, the section number field 220 (FIG. 3) is assigned a unique section number. Furthermore, the total data records field 224 (FIG. 3) is set to zero. In addition, the offset field 232 (FIG. 3) is initialized to zero. The database management system 106 then returns to the state 502 to determine whether there are additional data sections 214 to initialize. If the database management system 106 determines that all of the data sections 214 have been initialized, the database management system 106 finishes the database creation process.

In another embodiment of the invention, rather than initializing all of the database pages up front, a bit field can be kept in the header section 204 which specifies which of the sections has been initialized.

Figure 6:
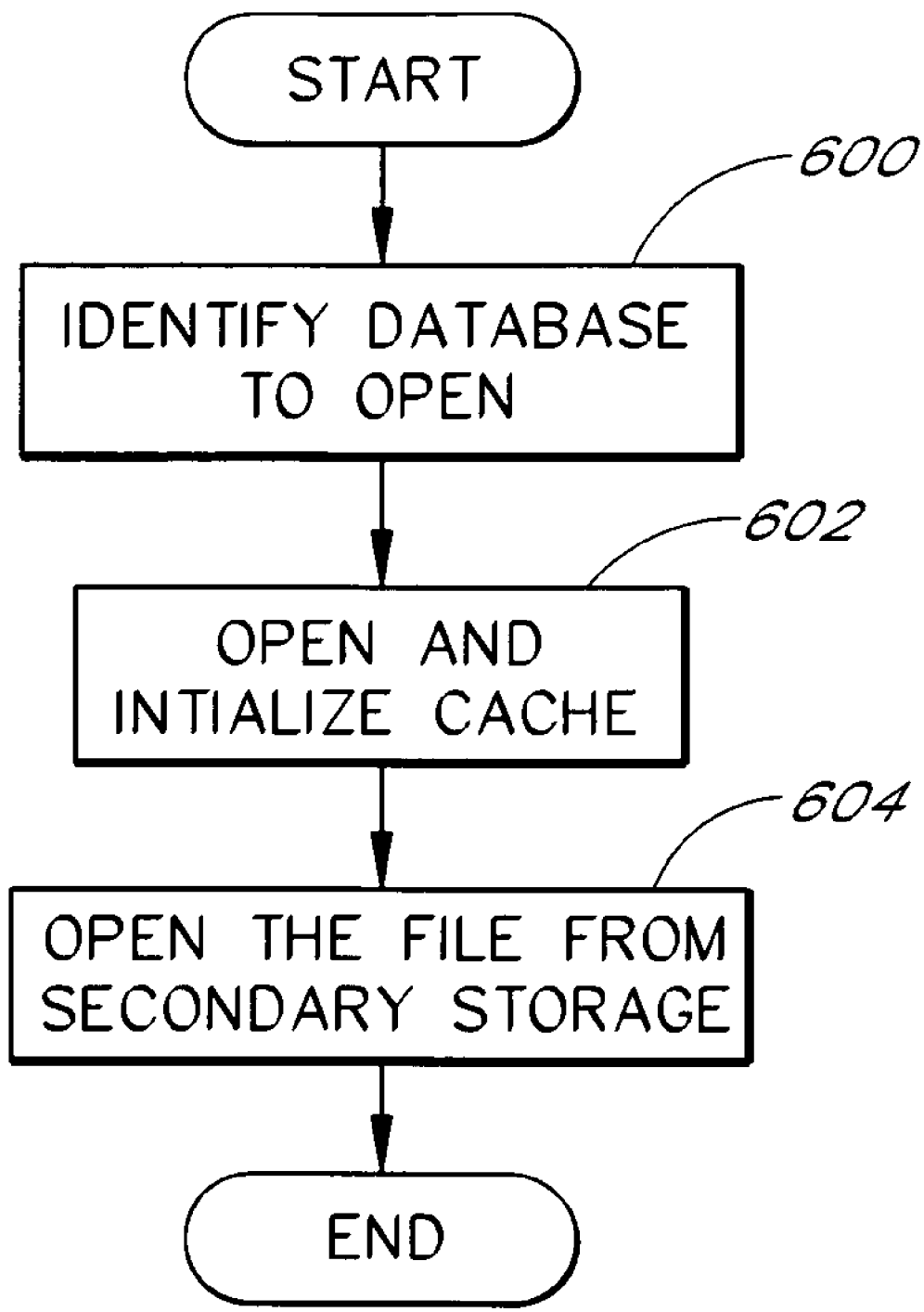
FIG. 6 is a flowchart illustrating a process for opening a database data structure which was is shown in FIG. 3.

FIG. 6 is a flowchart illustrating a process for opening the database data structure 200 (FIG. 3). Before the database data structure 200 can be opened, the database data structure 200 has been created by the process shown in FIG. 5. Starting at a state 600, the client application 190 (FIG. 2) calls the open function which is exported by the database manager 192 (FIG. 2). As part of the open function, the client application 190 identifies the file name that is associated with the database data structure 200 and was provided by the client application 190 during a create request. Moving to a state 602, the database management system 106 (FIG. 2) opens and initializes a cache, an area in memory, for the file that is identified by the client application 190. Continuing to a state 604, the database management system 106 opens the database file which is stored in secondary storage 198. In one embodiment of the invention, the database management system 106 uses a file system procedure that is exported by the operating system (not shown) to open the file. After the database data structure 200 has been opened, the client application 190 can store and retrieve data items from the database data structure 200.

Figure 7:
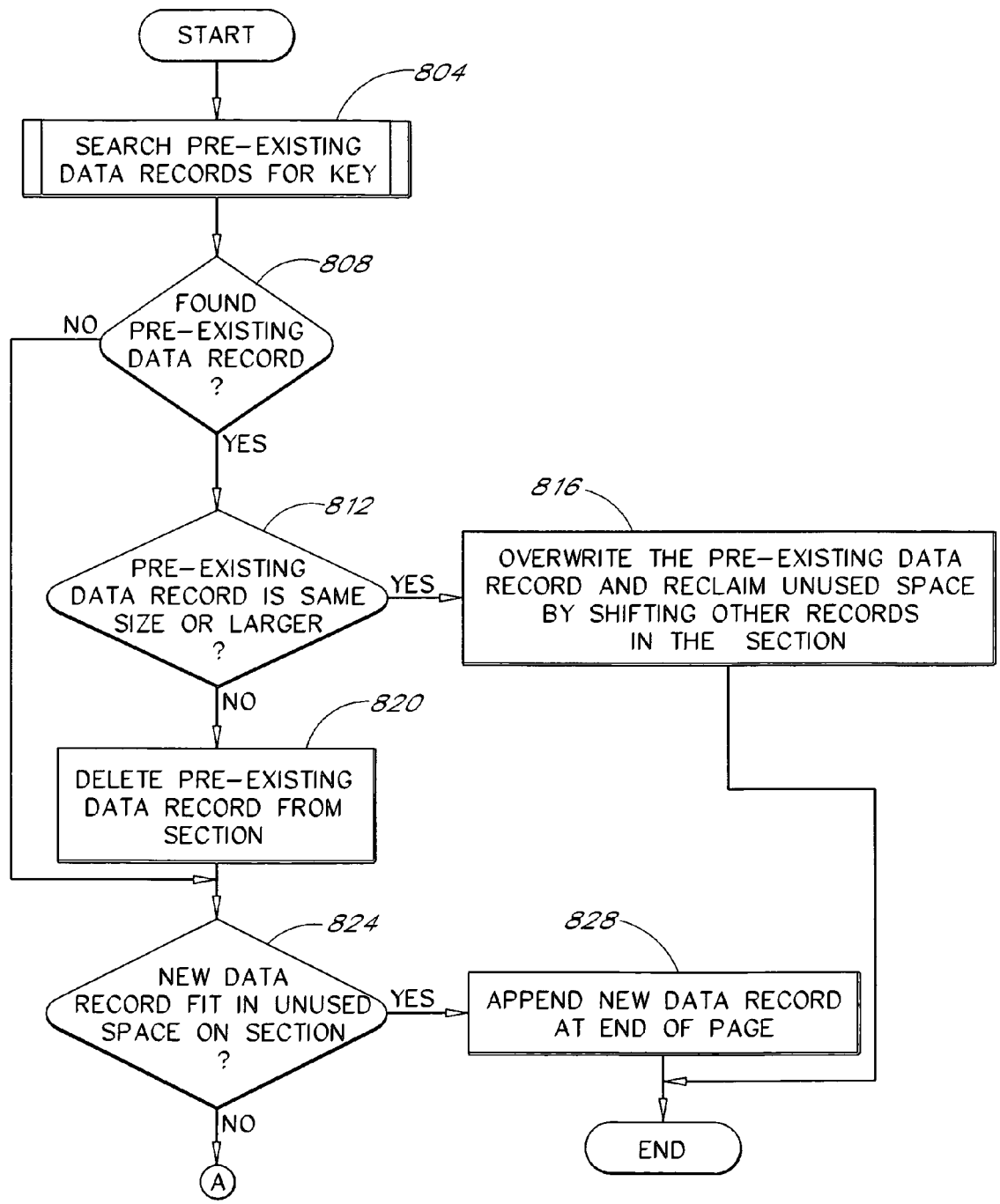
FIGS. 7 and 8 are in combination a flowchart illustrating a process for putting a data record in the database data structure shown in FIG. 3.
Figure 8:
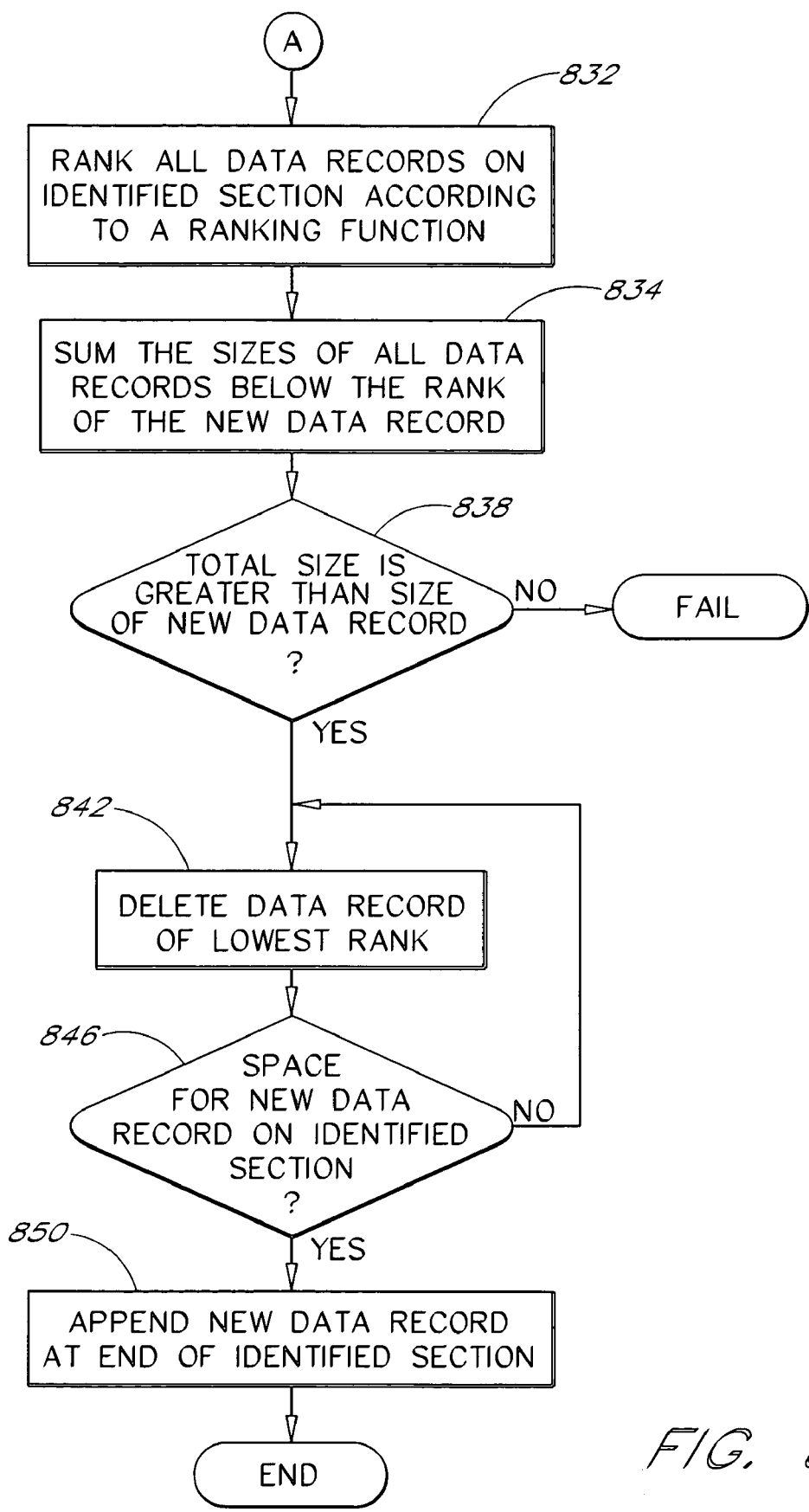

FIGS. 7 and 8 are in combination a flowchart illustrating a process for storing a data record in the database data structure 200 that is currently open. Starting at a state 804, the client application 190 (FIG. 2) executes the put function of the database manager 192 (FIG. 2). As parameters to the put function, the client application 190 passes a new data record. The new data record is identical in format to the data records 232. At the state 804, the database manager 192 identifies a data section based upon the key that is identified by the key field 316 of the new data record. In one embodiment of the invention, the database management system 106 iterates through each of the characters in the key to perform the hashing function. In this embodiment, the database management system 106 applies the algorithm shown below in Equations (Lines) 2-5 to accomplish this function.

$$\text{HASH} = 0, \quad (2)$$

$$X = 1 \text{ TO NUMBER\_OF\_CHARACTERS\_IN\_KEY}, \quad (3)$$

$$\text{HASH} = ((\text{HASH} * \text{PRIME\_NUMBER}) \text{ xor KEY\_CHARACTER}(X)), \quad (4)$$

$$\text{HASH} = (\text{HASH modulo NUMBER\_OF\_SECTIONS}) + 1, \quad (5)$$

Where X=a looping variable,
NUMBER_OF_CHARACTERS_IN_KEY=the number of characters in a given key,
PRIME_NUMBER=any prime number,
KEY_CHARACTER(X)=the X'th ASCII character in the key, and
NUMBER OF SECTIONS=the number of sections in the database data structure 200.

It is noted that other algorithms may be used to identify a data section based upon a provided key. The database management system 106 (FIG. 2) then searches the identified section for any pre-existing data records 232 that have a key that is identical to the key that is associated with the new data record.

Moving to decision state 808, the database management system 106 (FIG. 2) determines whether a match is found. The process for searching the database data structure 106 (FIG. 2) is described below with reference to FIG. 12. If the database management system 106 determines that a match is found, the database management system 106 proceeds to a decision state 812. Otherwise, if the database management system 106 does not find a match, the database management system 106 proceeds to a decision state 824.

Referring again to the decision state 812, the database management system 106 (FIG. 2) determines whether the matching pre-existing data record is the same size or larger than the new data record. If the matching pre-existing data record is the same size or larger than the new data record, the database management system 106 proceeds to a state 816. At the state 816, the database management system 106 overwrites the pre-existing data record with the new data record. An overwrite of the pre-existing data is acceptable because the Put operation is defined to overwrite existing data with the same key. Furthermore, the database management system 106 reclaims any unused space which is not used by the new data structure by moving other data records, e.g., shifting upwards each of the data records on the section. From the state 816, the database manager 192 indicates to the client application 190 that the put function was successful.

Figure 9:
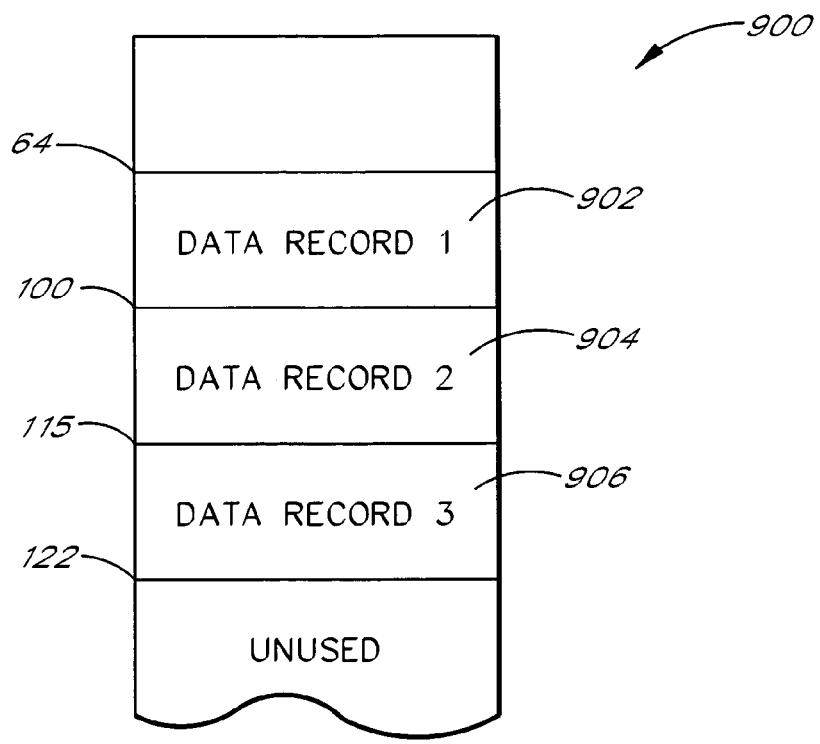
FIG. 9 is a block diagram illustrating an exemplary set of contents of a section of the database shown in FIG. 3, the section having a first, second and third data record.

A successful overwrite of a data record is pictorially shown in FIGS. 9 an 10. Referring to FIG. 9, an exemplary data section 900 is illustrated. The data section 900 includes a first data record 902 that starts at a byte 64 and ends at byte 99. Furthermore, the data section 900 includes a second data record 904 that starts at a byte 100 and ends at byte 114. Lastly, the data section 900 includes a third data record 906 that starts at byte 115 and ends at byte 121.

Figure 10:
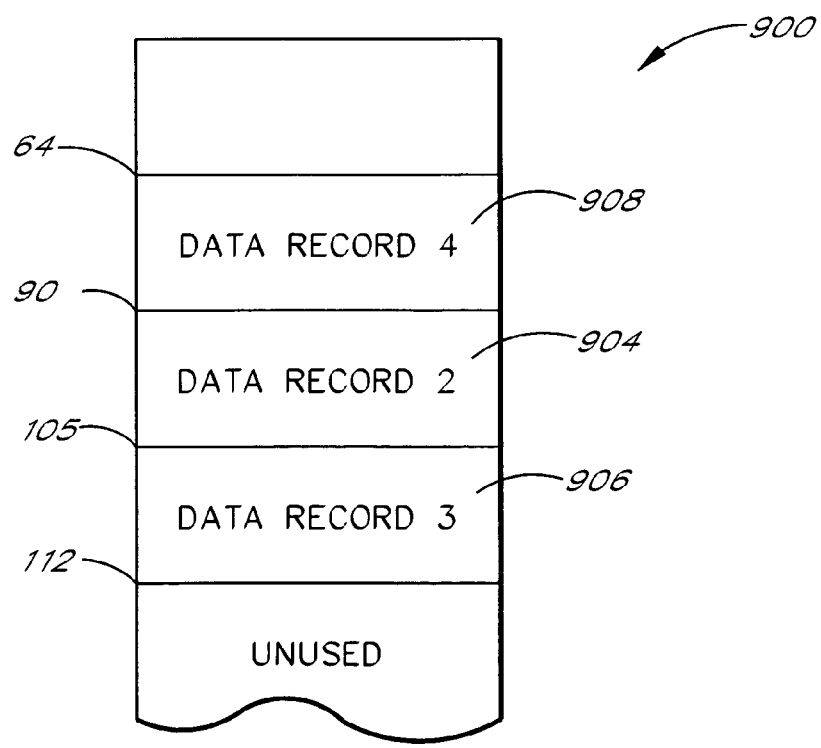
FIG. 10 is a block diagram illustrating the contents of the section shown in FIG. 9 subsequent to having a fourth data record inserted into the section.

FIG. 10 illustrates the contents of the section 900 after the database management system 106 (FIG. 2) determines that a fourth data record 908 is to be inserted into the database data structure 200 and that the fourth data record 908 has the same key as the first data record 902. The fourth data record 908 has a total of 25 bytes, as contrasted to the first data record 902, which has a length of 35 bytes. After the insertion, the fourth data record 908 starts at the byte 64 and ends at the byte 89. Further, the second data record 904 had been shifted up to start up byte 90 and end at byte 104. Similarly, the third data record 906 has been shifted upwards to start at byte 105 and end at byte 111.

Referring again to state 812 and FIG. 7, if the database management system 106 (FIG. 2) at the state 812 determines that the pre-existing data record is smaller than the new data record, the database management system 106 (FIG. 2) proceeds to a state 820. Since the new data record will not fit in the space occupied by the pre-existing data record, an overwrite operation cannot be performed. At the state 820, the database management system 106 deletes the matching pre-existing data record from the section. This is possible because the pre-existing data record now contains an older version of the data record. From either the decision state 808 or the state 820, the database management system 106 proceeds to a decision state 824. At the decision state 824, the database management system 106 determines whether the new data record fits in the unused space in the section. If the new data record fits in the unused space on the data section, the database management system 106 proceeds to a state 828. At the state 828, the database management system 106 inserts or appends the new data record at the first available position in the unused space of the data section. Furthermore, the database management system 106 updates the offset field 232 that is associated with the data section and completes the put function by indicating to the client application 190 that the insertion was a success.

Referring to the decision state 824, if the database management system 106 (FIG. 2) determines that the new data record will not fit in the unused space on the identified section, the database management system 106 proceeds to a state 832 (FIG. 8). At the state 832 through a state 850, the data management system 106 attempts to delete a sufficient number of the data records 232 to provide enough space to hold the new data record.

At the state 832, the database management system 106 (FIG. 2) ranks all of the data records 232 on the identified section according to a ranking function. In one embodiment of the present invention, the database management system 106 ranks each of the data records 232 according to when each of the data records 232 were last used. In this embodiment, the database management system 106 assigns a higher rank to a data record that has been used more recently than a later used data record. As was discussed above with reference to FIG. 4, each of the data records 232 includes an access time stamp field 312 which identifies the last time that the data record was used. Thus, after comparing the time stamps of all data records 232 in the section, the oldest time stamp will have the lowest rank.

However, it is to be appreciated by the skilled technologist, that other ranking schemes may be used. For example, each of the data records 232 could have an associated priority level and each of the data records could be ranked according to this priority level.

Proceeding to a state 834, the database management system 106 (FIG. 2) sums the sizes of all of the data records 232 that are below the rank of the new data record. For example, assume that a new data record having a length of 40 bytes is to be added to the section 900 (shown in FIG. 9). Further assume that there are 6 bytes of unused space in the data section 900. Also in this example, assume that the first data record 902 was accessed the most recently of all of the data sections 233 in data section 900, that the second data record 904 was accessed the second most recently, and that the third data record 906 was accessed the least recently. In this embodiment, the sum of the first data record 902, the second data record 904 and the third data record 906 totals 57 bytes.

Continuing to a decision state 838, the database management system 106 (FIG. 2) determines whether the calculated total size (which was calculated in the state 834) is greater than the size of the new data record. If the calculated total size is not greater than or equal to the size of the new data record, the database management system 106 returns a failure to the client application 190. Thus, the database management system 106 was unable to store the data record in the section. However, if the database management system 106 determines that the total size is greater than the size of the new data record, the database management system 106 proceeds to a state 842.

At state 842, the database management system 106 (FIG. 2) deletes the data record having the lowest rank. Using the example set forth above with reference to state 834, since the third data record 906 was the data record that has not been accessed for the longest period of time, the database management system 106 deletes the third data record 906. Continuing to a decision state 846, the database management system 106 determines whether there is now sufficient space for the new data record in the identified section. If the database management system 106 determines that there is still insufficient space, the database management system 106 loops to state 842 to delete the data record having the lowest rank of all of the undeleted data records. However, if the database management system 106 determines that there is sufficient space for the new data record subsequent to deleting the lowest ranking data record, the database management system 106 proceeds to a state 850. At the state 850, the database management system 106 appends the new data record at the end of the identified section after shifting the non-deleted data records upward. The database management system 106 then returns a message to the client application 190 indicating that the data record had been successfully inputted into the currently open database data structure 200.

Figure 11:
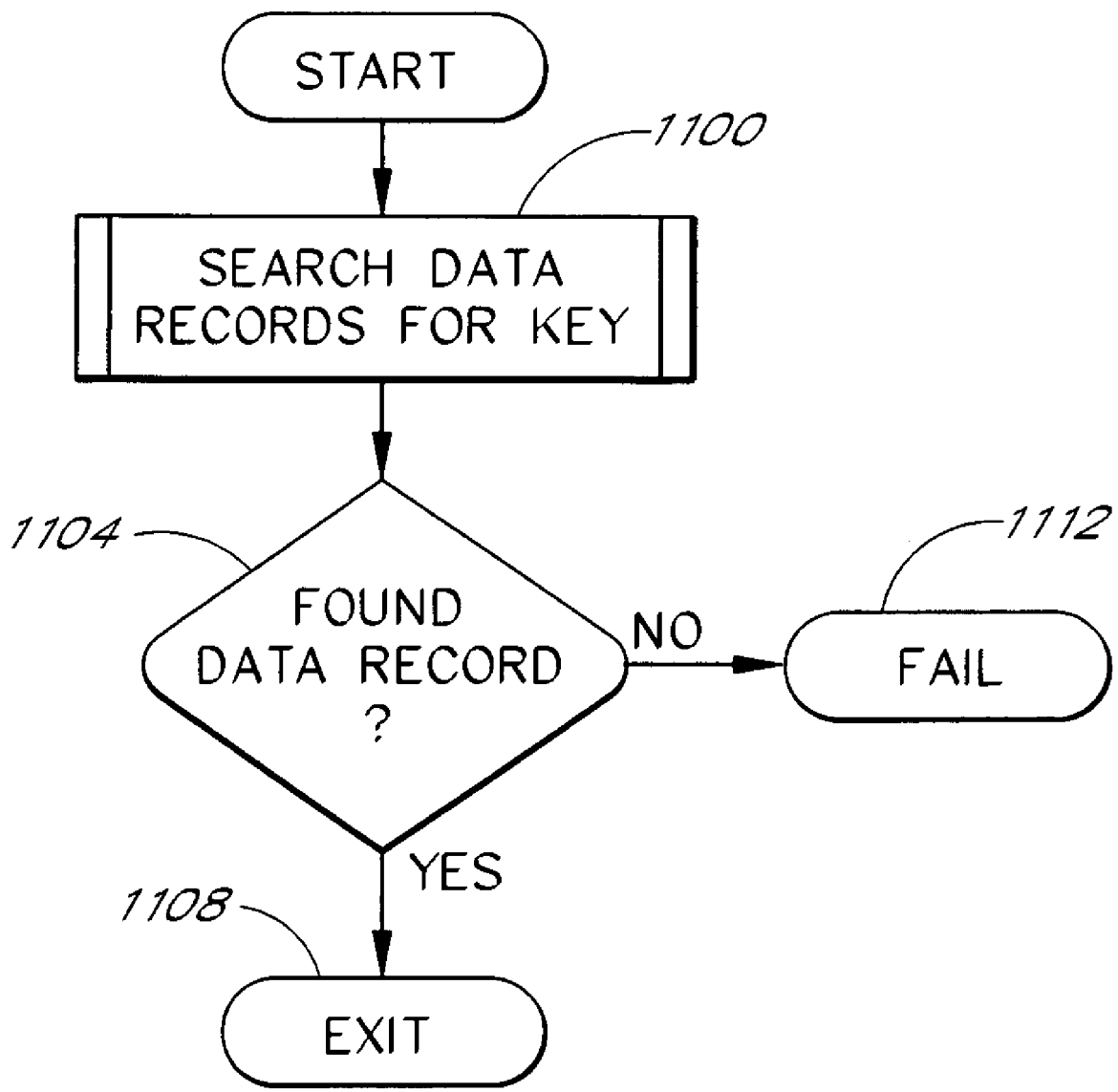
FIG. 11 is a flowchart illustrating a process for retrieving a data record from the database data structure shown in FIG. 3.

FIG. 11 is a flowchart illustrating a process for retrieving one of the data records 232 from the database data structure 200. FIG. 11 illustrates the process that occurs when the client application 190 (FIG. 2) invokes the get procedure of the database manager 192. Starting at a state 1100, the database management system 106 identifies one of the data sections 214 based upon a key which has been provided by the client application 190. The process for searching for a data record within one of the data sections 214 is described below with reference to FIG. 14.

Continuing to a decision state 1104, the database management system 106 (FIG. 2) determines whether it can find the requested data record. If the database management system 106 finds the requested data record, the database management system 106 proceeds to a state 1108, retrieves the data record from the database section memory, and returns the contents of the found data record to the client application 190 (FIG. 2). Otherwise, if the database management system 190 cannot find the requested data record, the database management system 106 proceeds to a state 1112. At the state 1112, the database management system 106 returns a message to the client application 190 indicating that the requested data record could not be found. This may result when the client application 190 passes an erroneous key.

Figure 12:
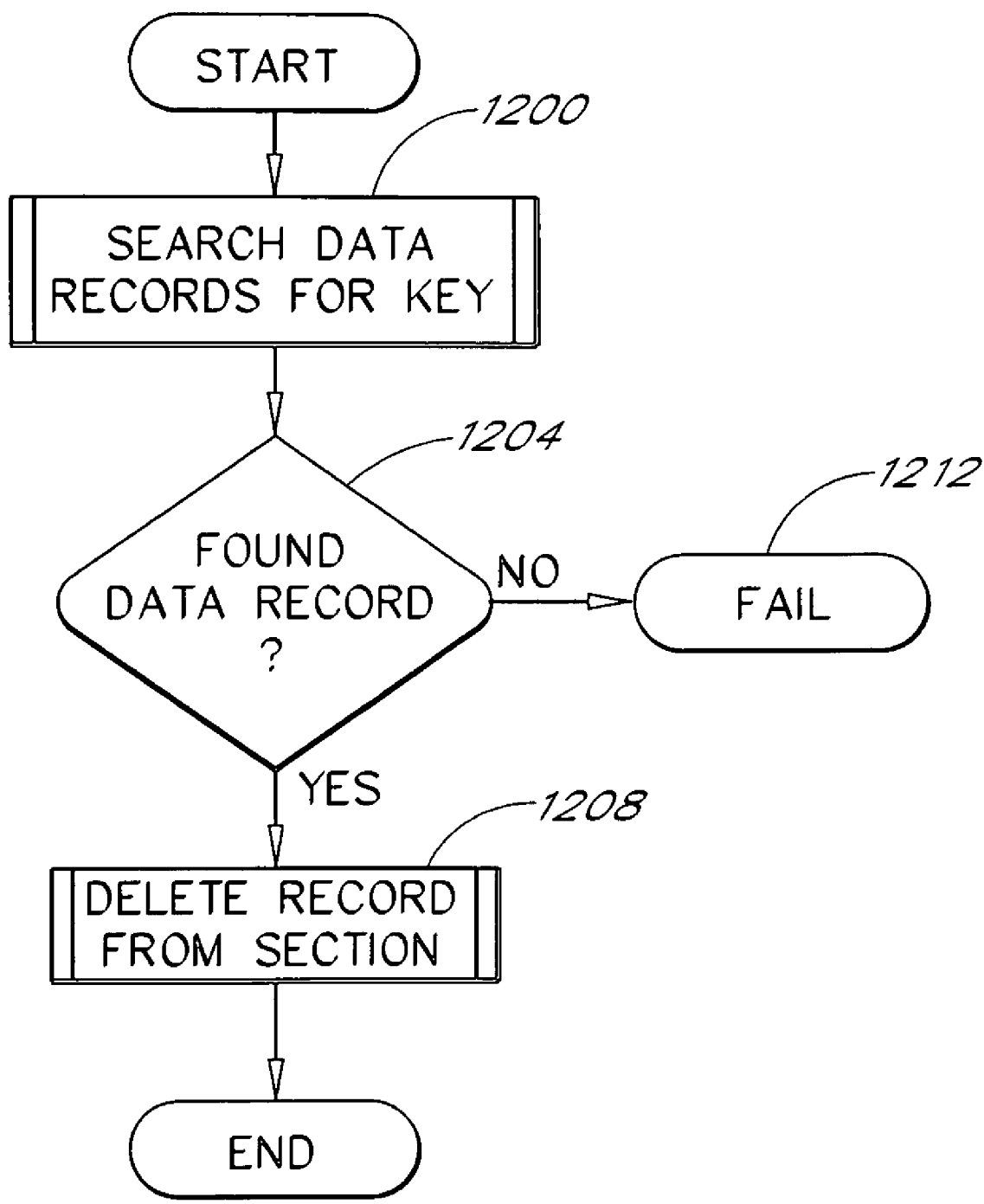
FIG. 12 is a flowchart illustrating a process for deleting a data record from the database data structure shown in FIG. 3.

FIG. 12 is a flowchart illustrating a process for deleting one of the data records 232 from the database data structure 200. FIG. 12 illustrates the process that occurs when the client application 190 (FIG. 2) executes the delete function of the database manager 192. Starting at a state 1200, the database management system 106 (FIG. 2) identifies one of the data sections 214 based upon a key which has been provided by the client application 190. The process for searching for a data record within one of the data sections 214 is described below with reference to FIG. 14.

Continuing to a decision state 1204, the database management system 106 (FIG. 2) determines whether it can find the requested data record. If the database management system 106 finds the data record, the database management system 106 proceeds to a state 1208. At the state 1208, the database management system 106 deletes the identified record from the database data structure 200. The process for deleting a record from one of the data sections 214 is set forth below with reference to FIG. 15.

Referring again to the decision state 1204, if the data management system 106 (FIG. 2) does not find the identified data record, the database management system 106 proceeds to a state 1212. At the state 1212, the database management system 106 returns a message to the client application 190 indicating that the data record to be deleted could not be found.

Figure 13:
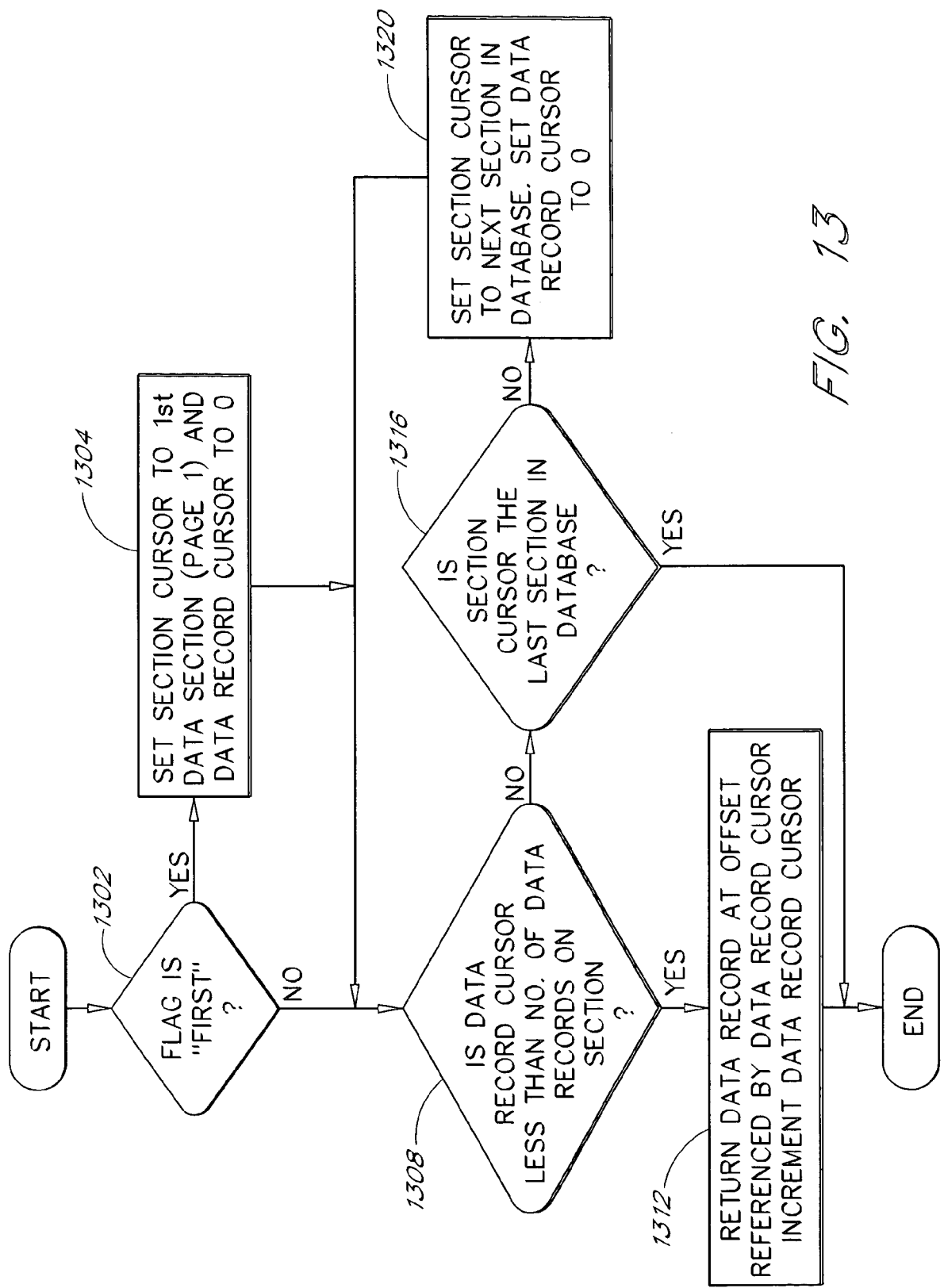
FIG. 13 is a flowchart illustrating a process for sequencing through the data records in the database data structure shown in FIG. 3.

FIG. 13 is a high level flowchart illustrating a process for traversing through each of the data records 232 that are within the database data structure 200. FIG. 13 illustrates the process that occurs when the client application 190 (FIG. 2) executes the sequence procedure of the database manager 192.

The sequence procedure includes as one of its parameters a beginning flag. The beginning flag identifies whether to start retrieving data records at the beginning of the database data structure or at the last identified data record. It is noted that other types of flags, such as middle, end, etc. may also be employed.

The database management system 106 maintains two positioning or "cursor" variables. First, a section cursor variable references one of the data sections 214. Second, a data record cursor variable references one of the data records on the section identified by the section cursor. In one embodiment of the invention, the section cursor variable contains an integer that matches the section number identified in one of the section number fields 220 (FIG. 3). Further, in this embodiment of the invention, the data record cursor references one of the data records by containing an integer that represents the positioning of one of the data records with respect to other data records in that data section. For example, with reference to FIG. 9, if the data record cursor variable referenced the first data record 902, the data record cursor variable would be equal to one.

Starting at a decision state 1302, the database management system 106 determines whether the beginning or "first" flag is set. If the beginning flag is set, the database management system 106 proceeds to a state 1304. At the state 1304, the database management system 106 sets the sector cursor variable to the first data section within the database data structure 200 (FIG. 2). Furthermore, the database management system 106 sets the data record cursor variable to be zero.

From either the decision state 1302, if the beginning flag is not set, or from the state 1304, the database management system 106 proceeds to a decision state 1308. At the decision state 1308, the database management system 106 determines whether the data record cursor variable exceeds the total number of records which is identified by the total data record field 224 (FIG. 3). If the value of the data record cursor variable is less than the total number of records, the database management system 106 proceeds to a state 1312. Otherwise, if the value of the data record cursor variable exceeds the total number of records, the database management system 106 proceeds to a state decision 1316.

At the state 1312, the database management system 106 sends the data record that is currently identified by the data record cursor variable to the client application 190. Further, at the state 1312, the sequence operation is complete.

Referring again to the decisions state 1308, if the data record cursor variable exceeds the total number of records, the database management system 106 proceeds to a decision state 1316. At the decision state, the database management system 106 determines whether the section cursor variable references the last section in the database. If the section cursor variable references the last page in the database data structure 200, the database management system 106 returns a message to the client application 190 indicating that the end of the database data structure 200 has been reached. Alternatively, in another embodiment of the invention, the database management system 106 can position the section cursor variable to the first section within the database.

However, at the decision state 1316, if the section cursor variable is not the last section in the database data structure 200, the database management system 106 proceeds to a state 1320. At the state 1320, the database management system 106 sets the section variable cursor to the next section within the database data structure 200. In one embodiment of the invention, the database management system 106 uses the Berkley DB cache_get_page function which is provided by the caching subsystem 194. However, in another embodiment of the invention, the database management system 106 retrieves the section by reading directly from the secondary storage 198 (FIG. 2). Still referring to the state 1320, the database management system 106 sets the data record cursor variable to equal zero. The database management system 106 then returns to the decision state 1308.

Figure 14:
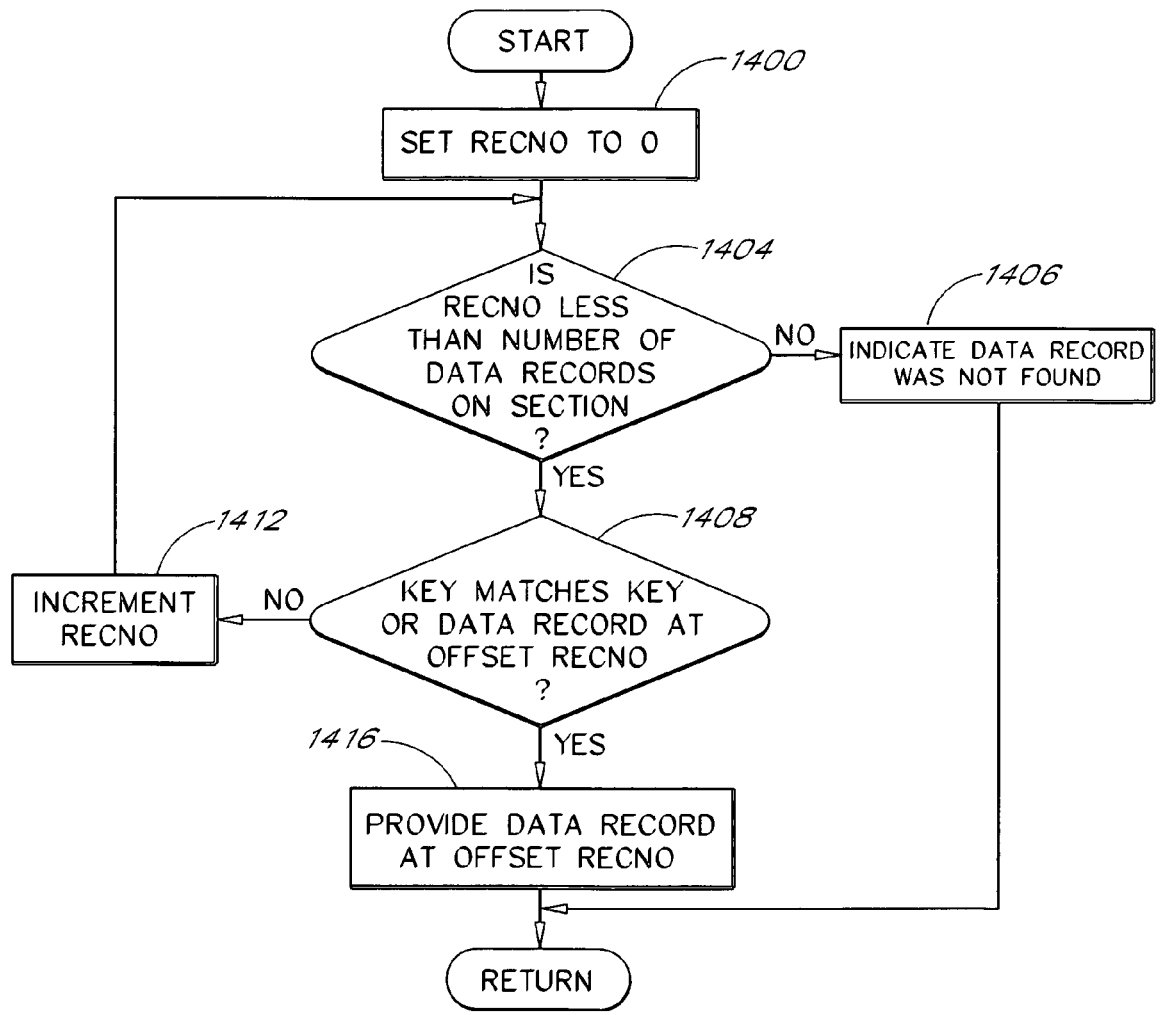
FIG. 14 is a flowchart illustrating a process for searching the database data structure shown in FIG. 3 for a data record based upon a specified key, the flowchart further illustrating the actions that are performed with respect to FIGS. 7, 11, and 12.

FIG. 14 is a flowchart illustrating a process for searching in a selected section for a data record given a specified key. FIG. 12 describes in further detail state 804 of FIG. 7, state 1100 of FIG. 11, and state 1200 of FIG. 12. Starting at a state 1400, the database management system 106 identifies a data section by applying the algorithm of Equations 2-5, which is set forth above. Still referring to the state 1400, the database management system 106 sets a looping variable "RECNO" to be zero. The database management system 106 uses the variable "RECNO" to iterate through each of the data records 232 in the data section identified by Equation 2. Continuing to a decision state 1204, the database management system 106 determines whether the variable "RECNO" is less than the total number of data records 232 in the data section. If the variable "RECNO" is less than the number of data records in the data section, the database management system 106 proceeds to a state 1406. At the state 1406, the database management system 106 informs the client application 190 (FIG. 2) that the requested data record is not found.

Referring again to the decision state 1404, if the database management system 106 (FIG. 2) determines that the variable "RECNO" is less than or equal to the number of data records in the data section, the database management system 106 proceeds to a decision state 1408. At the decision state 1408, the database management system 106 determines whether the provided key matches the key that is associated with the data record which is referenced by the variable "RECNO." If the database management system 106 determines that the provided key matches the key that is associated with the data record identified by the variable "RECNO", the database management system 106 proceeds to a state 1216.

At the state 1216, the database management system 106 provides the identified data record to the client application 190 (FIG. 2). However, referring again to the decision state 1408, if the database management system 106 determines that the key does not match the key which is referenced by the variable "RECNO", the database management system 106 proceeds to a state 1412. At the state 1412, the database management system 106 increments the variable "RECNO" to reference the next data record in the identified section. From the state 1412, the database management system 106 returns to the decision state 1404 and continues to iterate through each of the data records in the data section in an attempt to identify the requested data record.

Figure 15:
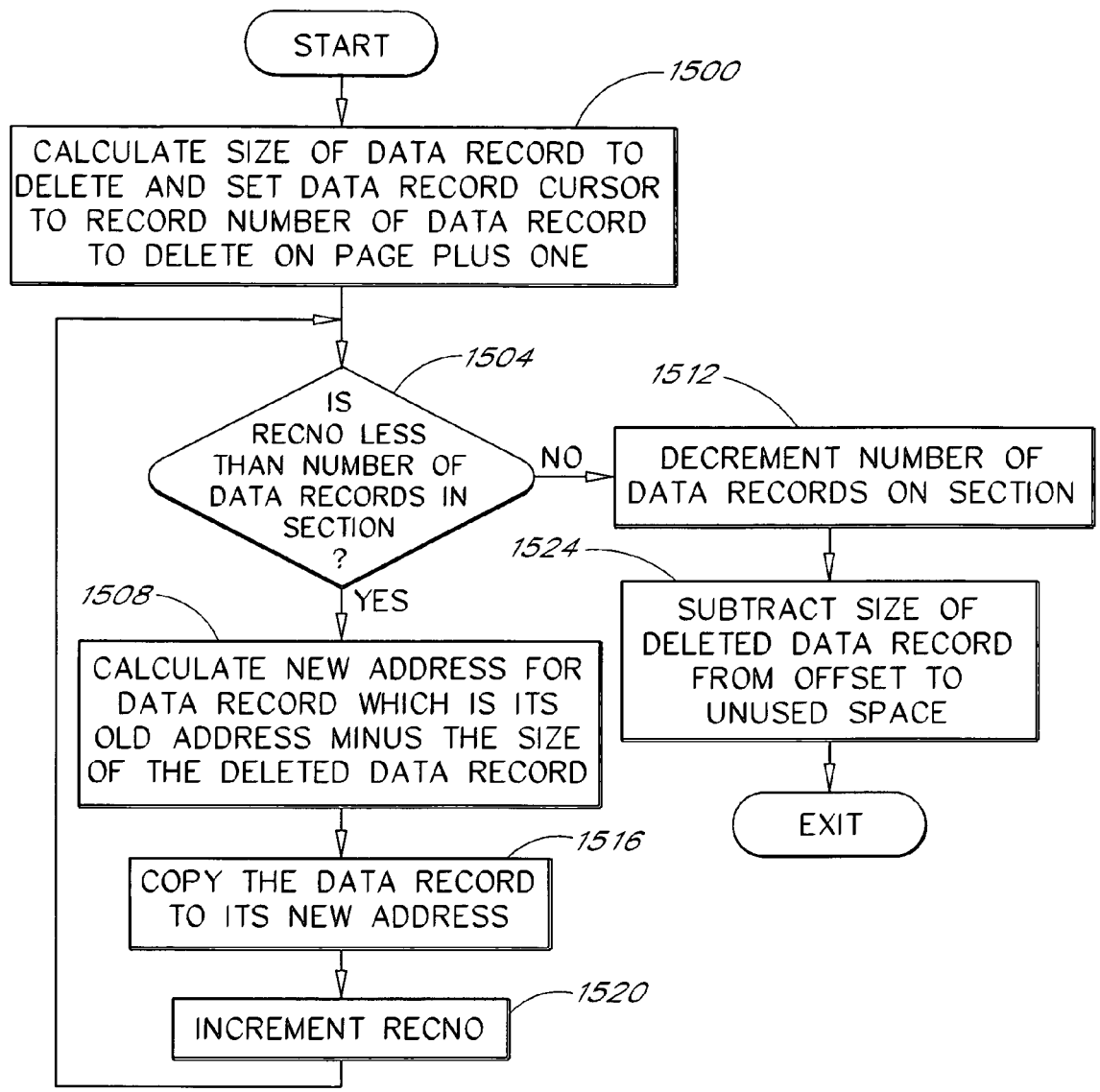
FIG. 15 is a flowchart illustrating a process for deleting a data record from the database data structure shown in FIG. 3, the data record further illustrating the acts that occur with respect to FIG. 12.

FIG. 15 is a flowchart illustrating a process for deleting a data record from the database data structure 200 (FIG. 2). FIG. 15 illustrates in further detail the acts that occur with state 1208 of FIG. 12. Starting at a state 1500, the database management system 106 has received a request to delete a selected one of the data records 232. Furthermore, the database management system 106 has identified which data section 214 contains the data record. The database management system 106 calculates the size of the data record to be deleted. In one embodiment of the invention, this may be accomplished by summing the size identified in the key size field 304 (FIG. 4), the size of the data size field 308 (FIG. 4), the length of the key size field 304 and the length of the data size field 308. Furthermore, at the state 1500, for sequencing purposes, if the data record cursor references a data record after the data record to be deleted and if the section cursor matches the section in which the data record to be deleted resides, the database management system 106 decrements the data record cursor variable.

Moving to a decision state 1504, the database management system 106 (FIG. 2) determines whether the value of the variable "RECNO" is less than the number of data records in the data section. In one embodiment of the invention, the number of data records is stored in the total data records field 224 (FIG. 3). If the value of the variable "RECNO" is less than the number of data records, the database management system 106 proceeds to a state 1508. Of course, in other embodiments, another technique to move records could be used. At the state 1508, the database management system 106 starts an iterative process to move each of the data records that reside below the data record to be deleted upwards toward the top of the section. At the state 1508, the database management system 106 calculates a new address for the data record identified by the variable "RECNO".

Continuing to a state 1516, the database management system 106 (FIG. 2) copies the content of the data record to start at its new address (calculated in the state 1508). It is noted that in one embodiment, the deleted data records are stored in a secondary database data structure (not shown). In this embodiment, the database data structure 200 operates as a high speed cache for the secondary database data structure.

Next, at the state 1520, the database management system 106 increments the variable "RECNO". The database management system 106 then returns to the decision state 1504 to determine if all of the data records that were initially below the deleted data record have been moved upwards.

Referring again to the state 1504, if the value of the variable "RECNO" is not less than number of data records in the section, the database management system 106 (FIG. 2) proceeds to a state 1512. At the state 1512, the database management system 106 decrements the value contained in the total data records field 224 (FIG. 3). Moving to a state 1524, the database management system 106 subtracts the size of the deleted data record from the offset field 228. The process then returns to the state 1208 of FIG. 12.

The database management system 106 requires low-maintenance and is resistant to errors. Since the size of database data structure 200 is statically defined, the database management system 106 does not need to monitor the available space in the secondary storage 198 (FIG. 2) with respect to the database data structure. Furthermore, the database data structure 200 is designed such that no dependencies exist between any of the data sections. Advantageously, if one of the sections in the database data structure 200 becomes corrupted, such error does not have any affect on any of the other data sections. In addition, since each of the data sections are always in a consistent state, a backup or copy operation can occur while the database data manager 106 is operating. A copy operation can be performed by simply copying the image of the database data structure 200 that is stored in the secondary storage 198.

Further, certain embodiments of the database management system 106 are very efficient at managing statistical information, wherein the contents of any one particular data record is unimportant, but wherein the overall contents of the database data structure is considered valuable. Since each data record is associated with only one of the sections in the database data structure 200 (FIG. 2) and each of the sections are the same size as the pages that are managed by the caching subsystem 194 (FIG. 2), the database management system 106 can perform a search operation with at most one physical page read from the secondary storage 198 (FIG. 2). Further, by utilizing a cache of sections, the database management system 106 can perform a search operation in, on average, much less than one physical page read from the secondary mass storage 198.

Further, the database management system 106 is also particularly well-suited for use with maintaining user profiles. Each user profiles can be used to contain any type of information about an selected Internet user. By applying the ranking function (described above with reference to 832 of FIG. 8) upon each addition of a new data record, the database management system 106 automatically eliminates inactive user profiles. In this embodiment, the most desirable users (as defined by a web site) are stored in the database data structure 200, while less desirable or transient users are replaced to make room for more desirable users as necessary. Furthermore, an additional database system can be configured to stored those profiles dropped from the database data structure 200 allowing the database data structure 200 to operate as a high-speed persistent cache.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A computer implemented method for managing a database data structure partitioned into a plurality of sections, each of the sections comprising a plurality of data records, the method comprising:
receiving a new data record and a key associated with the new data record;
identifying one of the sections based upon the associated key of the new data record in response to said receiving said new data record and said associated key;
determining if said new data record fits in an unused storage space in said identified section based on a size of said new data record in response to said identifying one of the sections;
storing said new data record in said identified section if said new data record fits in said unused storage space and ending the process;
ranking all data records in said identified section according to a computer implemented ranking function;
summing sizes of all said data records below rank of said new data record;
ending the process by returning a failure indicator, indicating said database data structure is unable to store said new data record in the identified section if said sum is not greater than said size of said new data record; and
deleting one or more data records from the identified section based on said ranking until there is sufficient space for the new data record and appending the new data record at the end of the identified section if said sum is greater than said size of said new data record.

2. The method of claim 1, wherein the ranking function is a least recently used algorithm.

3. The method of claim 1, wherein the ranking function is a function of the statistical properties of the data being stored.

4. The method of claim 1, wherein each of the plurality of sections is an integer multiple of the page size used by an operating system to transfer data between a primary storage and a secondary storage.

5. The method of claim 1, wherein each of the sections is about the same page size used by an operating system to transfer data between a primary storage and a secondary storage.

6. The method of claim 1, allocating a contiguous memory space to contain each of the sections.

7. A program storage device storing program instructions that when executed perform the program for managing a database data structure partitioned into a plurality of sections, each of the sections comprising a plurality of data records, the program comprising the steps of:
receiving a new data record and a key associated with the new data record;
identifying one of the sections based upon the associated key of the new data record in response to said receiving said new data record and said associated key;
determining if said new data record fits in an unused storage space in said identified section based on a size of said new data record in response to said identifying one of the sections;
storing said new data record in said identified section if said new data record fits in said unused storage space and ending the process;
ranking all data records in said identified section according to a computer implemented ranking function;
summing sizes of all said data records below rank of said new data record;
ending the process by returning a failure indicator, indicating said database data structure is unable to store said new data record in the identified section if said sum is not greater than said size of said new data record; and
deleting one or more data records from the identified section based on said ranking until there is sufficient space for the new data record and appending the new-data record at the end of the identified section if said sum is greater than said size of said new data record.

8. The program storage device of claim 7, wherein the ranking scheme identifies which ones of the data records are the least recently used.

9. The program storage device of claim 7, wherein each of the sections is about the same size used by an operating system to transfer data between a primary storage and a secondary storage.

10. A database system for managing data records, the system comprising:
a plurality of sections, each of the sections being about the same memory size used by an operating system to transfer data between a primary storage and a secondary storage; and
a control program performing the steps of:
receiving a new data record and a key associated with the new data record;
identifying one of the sections based upon the associated key of the new data record in response to said receiving said new data record and said associated key;
determining, if said new data record fits in an unused storage space in said identified section based on a size of said new data record in response to said identifying one of the sections;
storing said new data record in said identified section if said new data record fits in said unused storage space and ending the process;
ranking all data records in said identified section according to a computer implemented ranking function;
summing sizes of all said data records below rank of said new data record;
ending the process by returning a failure indicator, indicating said database data structure is unable to store said new data record in the identified section if said sum is not greater than said size of said new data record; and
deleting one or more data records from the identified section based on said ranking until there is sufficient space for the new data record and appending the new data record at the end of the identified section if said sum is greater than said size of said new data record.

11. The database system of claim 10, wherein the ranking function determines a last access time for each of the data records or the selected sections.

12. The database system of claim 10, wherein at least one of the sections includes at least one item of section information.

13. The database system of claim 12, wherein the section information includes the number of data records contained in the section.

14. The database system of claim 12, wherein the section information includes an offset from the beginning of the section to the first unused position within the section.

15. The database system of claim 12, wherein the section information includes a section number associated with the section.

16. The database system of claim 10, additionally comprising a client application which provides the storage request of the data record and the key to the control program.

17. A system for managing a database partitioned into a plurality of sections, each of the sections comprising a plurality of data records, the system comprising:
- receiving means for receiving one or more new data records, each of the new data records having an associated key;
- identifying means for identifying one of the sections based upon the associated key of the new data record, responsive to said receiving the new data record and the associated key;
- determining means for determining if the new data record fits in an unused space in said identified section based on a size of the new data record, responsive to said identifying one of the sections;
- storing means for storing the new data record in the identified section, if the new data record fits in the unused storage space and ending means for ending the process;
- ranking means for ranking all data records in the identified section according to a computer implemented ranking function, otherwise;
- summing means for summing sizes of all the data records below a rank of the new data record;
- ending means for ending the process by returning a failure indicator, indicating the database data structure is unable to store the new data record in the identified section, if the sum is not greater than said size of the new data record; and
- deleting means for deleting one or more data records from the identified section based on the ranking until there is sufficient space for the new data record and appending means for appending the new data record at the end of the identified section, if said sum is greater than said size of said new data record.

18. The system of claim 17, wherein the ranking function identifies which ones of the data records are the least recently used.

19. The system of claim 17, wherein the database occupies a single contiguous physical memory space.

20. The system of claim 17, wherein the size of each of the sections is an integer multiple to the page size used by an operating system to transfer data between a primary storage and a secondary storage.

21. The system of claim 17, wherein the size of each of the sections is about equal to the page size used by an operating system to transfer data between a primary storage and a secondary storage.

* * * * *